C. W. HUBBARD.
Saw.
No. 9,657. Reissued April 12, 1881.
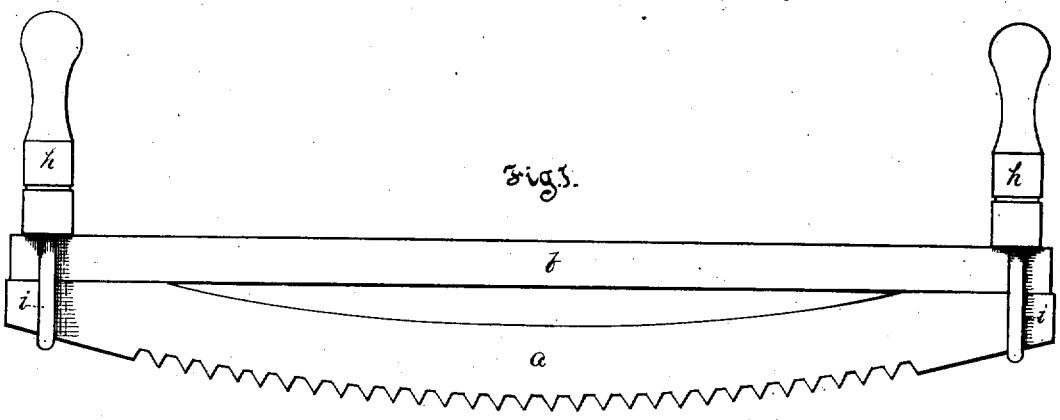
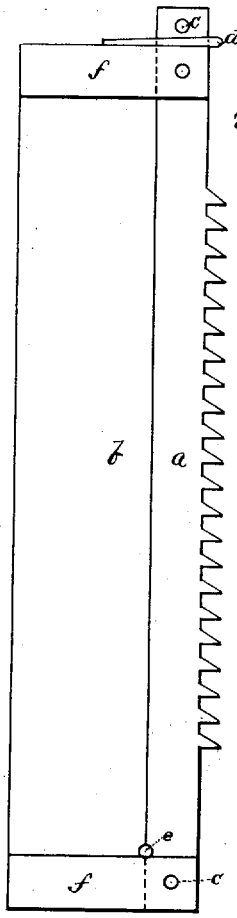
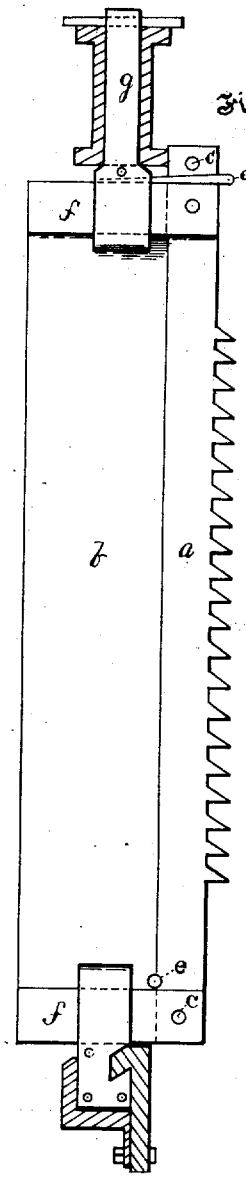
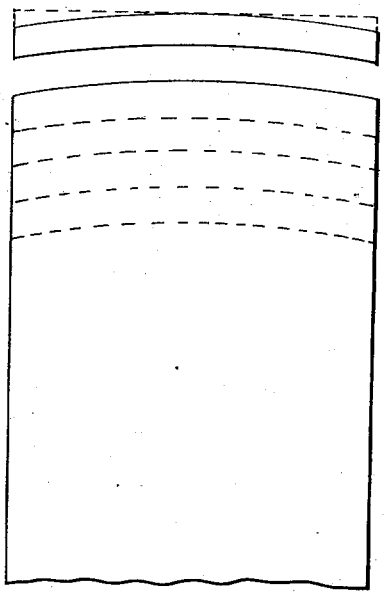
Witnesses.
R. C. Winchell
J. K. Smith
Inventor.
Charles W. Hubbard
by Bakewell & Kerr
Attorneys
N. PETERS, PHOTO-LITHOGRAPHER, WASHINGTON, D. C.

UNITED STATES PATENT OFFICE.

CHARLES W. HUBBARD, OF PITTSBURG, PENNSYLVANIA.

SAW.

SPECIFICATION forming part of Reissued Letters Patent No. 9,657, dated April 12, 1881.

Original No. 209,810, dated November 12, 1878. Application for reissue filed March 19, 1880.

*To all whom it may concern:*

Be it known that I, CHARLES W. HUBBARD, of Pittsburg, in the county of Allegheny and State of Pennsylvania, have invented a new and useful Improvement in Saws; and I do hereby declare the following to be a full, clear, and exact description thereof, reference being had to the accompanying drawings, forming part of this specification, in which—

Figure 1 represents a crosscut-saw embodying my invention. Fig. 2 shows the invention as applied to a gang or like saw. Fig. 3 represents the saw in connection with the saw buckle or stirrup for straining the same, and Fig. 4 is a diagram illustrating the manner in which the stock may be cut for crosscut-saws.

Like letters refer to like parts wherever they occur.

My invention relates to the construction of crosscut, muley, mill, gang, and similar saws; and it consists in forming the saw in sections arranged longitudinally edge to edge, the front section being the saw proper and the rear section or sections blanks, whereby a much narrower cutting-section is obtained, which is more readily and uniformly tempered, is equally strong when arranged for service, is not liable to buckle, and in mill, muley, and gang saws can be readily removed and gummed without disturbing the strain of the saws.

Several serious objections exist in the class of saws specified as at present constructed and operated—as, for instance, first, in the manufacture of the saw the width of blade commonly used is such that great difficulty is experienced in properly tempering it, and yet the width cannot be materially reduced without lessening the strength and durability of the article; secondly, in use the friction incident to a broad blade is often productive of great heat, buckling, &c.; thirdly, there is much loss of stock, as the frequent gumming soon reduces the blade so much that it has not the required strength and stiffness and has to be abandoned; fourthly, in muley, mill, and gang saws the constant straining alters the relative lengths of back and cutting edge, giving rise to buckling of the saw; fifthly, whenever the saws of a gang are removed for gumming they have to be rearranged and strained, which involves much time and labor.

The object, therefore, of the present invention is to so construct the saw or saws as to avoid in a great measure, if not entirely, the objections specified.

I will now proceed to describe my invention, so that others skilled in the art to which it appertains may apply the same.

In the drawings are shown two forms of saws, the crosscut and a gang saw, and the latter will apply to single saws—such as mill or muley—though I do not wish to be limited thereby. In each the blade is formed in longitudinal sections, one of which, *a*, is the cutting-section, carrying the teeth, and the other, *b*, may be termed a "blank" or "back," though, if desired, the portion *b* may be composed of several blanks. It is only essential that the saw-section *a* should be narrow, the stiffness and strength of the saw depending mainly on the blank (or blanks) *b*, on which the stress comes, and which may be of any desired width, but should not be thicker than the section *a*, or cutting-section. This section *a*, I form narrow, in order that I may temper it uniformly, and also because, by detaching it from the body of the saw, in lengthening under strain or from other cause, it will not be bound and caused to buckle.

In the course of manufacture, when making crosscut or like saws, I prefer to cut the blank as shown in diagram, Fig. 4, as thereby much stock is saved. In crosscut-saws the handles *h* may be secured by the staple *i*, which also serves to hold the blank *b* to the saw-section *a*, or any other approved plan may be adopted at will.

In many cases the section *a*, or serrated section curved longitudinally, with the back and edge substantially parallel, may be provided with a handle or handles and used alone (or without blank-sections *b*) as a crosscut-saw, whereby all the advantages of saving of stock in the manufacture, reduction of friction, lightness of running, and facility of tempering will be gained.

In muley, mill, gang, and like saws, the section *b*, or blank, is made wider and the section *a* secured thereto by keys or cotters *c* and staple-wedges *d*, and when extra security is desired a detachable rivet, *e*, may be inserted at the junction of the sections.

The dovetailed strips *f* for the stirrup or buckle *g* are in all cases secured to the blank section *b*, so that when the same are once strained and arranged they need not again be interfered with, the cutting-section *a* being simply detached for the purpose of gumming, and being quickly attached and strained or tightened when gummed or when required.

To obtain the best results in all cases it is essential that whatever means are employed to unite the sections *a b* they should be such as to permit independent longitudinal expansion of the sections, so as to avoid buckling and to permit straining.

The advantages of my invention in manufacturing are, saving of material and facility of tempering. In use the narrow blade lessens friction and prevents heating and buckling, and will run lighter. It facilitates the removal and gumming of the saws, and obviates the necessity of rearranging and straining after each gumming. It is cheaper to the user, as the blanks can be used again and again with several sets of cutting-sections.

I am aware that a saw of ordinary dimensions and construction has been strained in the same stirrups with a flat plate having an oblong mortise containing a plane-iron, the plate being in rear of and in line with the saw, the object of said devices being to plane the boards while sawing; and I do not claim the same. Neither do I claim the combination of a series of saw-blades placed side by side, with their rear edges abutting against a single wedge-shaped back plate, to which the saws are riveted, as such construction has heretofore been devised for sawing standing timber.

The prevention of buckling and reduction of friction and lightness of running mentioned in connection with the separate use of the curved section *a* as a crosscut-saw are due to the fact that it is so narrow relatively to the ordinary thickness of the saw that it cannot be caught in the kerf by the closing of the cut portions together, and consequently it needs no provision to hold the kerf open.

Having thus described the nature and advantages of my invention, what I claim, and desire to secure by Letters Patent, is—

1. A saw (whether crosscut, gang, or muley) composed of longitudinal sections, the front section (being the saw proper) having teeth, and the other section or sections being blank and of a thickness not greater than that of the front section, said sections being placed edge to edge when in use and connected together, substantially as and for the purpose specified.

2. A crosscut-saw composed of a cutting-section, bellied or curved longitudinally, and with the back edge substantially parallel to the front, and a straight back section or blank, the two sections connected so as to permit of independent longitudinal expansion, substantially as and for the purpose specified.

3. A curved crosscut or similar manual saw, having the back edge substantially parallel to the convex front or cutting edge, and made narrow throughout its length, substantially as described, so as not to bind in the kerf, as and for the purposes specified.

In witness whereof I, the said CHARLES W. HUBBARD, have hereunto set my hand.

CHARLES W. HUBBARD.

Witnesses:

FRANK W. SMITH,

T. B. KERR.